(12) United States Patent
De Filippis et al.

(10) Patent No.: US 9,712,657 B2
(45) Date of Patent: Jul. 18, 2017

(54) PROXYING FOR COMMUNICATING MESSAGES WITH AN UNREGISTERED ACCESSORY DEVICE

(71) Applicant: Apple Inc., Cupertino, CA (US)

(72) Inventors: Pierre J. De Filippis, San Jose, CA (US); Nicholas J. Circosta, Mountain View, CA (US); Daniel B. Pollack, San Francisco, CA (US); Gobind Johar, San Jose, CA (US); Justin Wood, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 27 days.

(21) Appl. No.: 14/871,647

(22) Filed: Sep. 30, 2015

(65) Prior Publication Data

US 2016/0234366 A1    Aug. 11, 2016

Related U.S. Application Data

(60) Provisional application No. 62/113,175, filed on Feb. 6, 2015.

(51) Int. Cl.
| | |
|---|---|
| *H04W 88/04* | (2009.01) |
| *H04M 1/72* | (2006.01) |
| *H04W 4/16* | (2009.01) |
| *H04L 29/08* | (2006.01) |
| *H04L 12/58* | (2006.01) |
| *H04W 4/18* | (2009.01) |
| *H04W 76/02* | (2009.01) |
| *H04W 84/18* | (2009.01) |

(52) U.S. Cl.
CPC ............ *H04M 1/72* (2013.01); *H04L 51/043* (2013.01); *H04L 51/38* (2013.01); *H04L 67/2814* (2013.01); *H04L 67/2842* (2013.01); *H04L 67/2861* (2013.01); *H04W 4/16* (2013.01); *H04W 4/18* (2013.01); *H04W 76/023* (2013.01); *H04L 51/14* (2013.01); *H04W 84/18* (2013.01); *H04W 88/04* (2013.01)

(58) Field of Classification Search
CPC .............................. H04M 1/72; H04W 88/02
See application file for complete search history.

(56) References Cited

U.S. PATENT DOCUMENTS

| | | |
|---|---|---|
| 6,128,509 A | 10/2000 | Veijola et al. |
| 7,315,727 B2 | 1/2008 | Hamadi et al. |
| (Continued) | | |

FOREIGN PATENT DOCUMENTS

WO    2015103048 A1    7/2015

OTHER PUBLICATIONS

International Search Report & Written Opinion, Application No. PCT/US2015/064535, mailed Mar. 9, 2016, 13 pages.

*Primary Examiner* — Christopher M Brandt
(74) *Attorney, Agent, or Firm* — Meyertons Hood Kivlin Kowert & Goetzel, P.C.; Jeffrey C. Hood

(57) ABSTRACT

Some embodiments relate to a mobile device, such as a smart phone, and associated method for enabling the mobile device to act as a communication proxy for an accessory device, such as a smart watch. The mobile device may be capable of providing proxy communication services for messages received from/provided to the accessory device even when the accessory device has not properly registered for the respective message service.

20 Claims, 6 Drawing Sheets

(56) References Cited

U.S. PATENT DOCUMENTS

| | | | |
|---|---|---|---|
| 2011/0058052 A1* | 3/2011 | Bolton | H04M 1/7253 348/211.99 |
| 2012/0110151 A1* | 5/2012 | Moore | G06F 9/526 709/223 |
| 2012/0229250 A1* | 9/2012 | Lim | G06F 21/84 340/5.8 |
| 2014/0273975 A1 | 9/2014 | Barat et al. | |
| 2014/0298353 A1 | 10/2014 | Hsu et al. | |
| 2014/0334271 A1* | 11/2014 | Park | G04G 21/04 368/10 |

* cited by examiner

Synchronizing State of Message Service
across Multiple Devices

Service Registration through Proxy

PROXYING FOR COMMUNICATING MESSAGES WITH AN UNREGISTERED ACCESSORY DEVICE

PRIORITY CLAIM

The present application claims benefit of priority to U.S. Provisional Application No. 62/113,175 titled "Proxying for Communicating Messages with an Unregistered Accessory Device" and filed on Feb. 6, 2015, which is hereby incorporated by reference as though fully and completely set forth herein.

FIELD

The present application relates to wireless communication, including enabling an accessory device, such as a smart watch, to utilize a companion wireless device as a proxy for communications.

DESCRIPTION OF THE RELATED ART

Wireless communication systems are rapidly growing in usage. Further, wireless communication technology has evolved from voice-only communications to also include the transmission of data, such as Internet and multimedia content.

Mobile electronic devices may take the form of smart phones or tablets that a user typically carries. Wearable devices (also referred to as accessory devices) are a newer form of mobile electronic device, one example being the smart watch. Typically, wearable devices have limited wireless communications capabilities and communicate over wired interfaces or short-range point-to-point technologies. Further, wearable devices typically have smaller batteries than larger portable devices, such as smart phones and tablets.

SUMMARY

Embodiments are presented herein of, inter alia, a mobile device, such as a smart phone, and associated methods for enabling the mobile device to act as a communication proxy for an accessory device, such as a smart watch. The mobile device may be capable of providing proxy communication services, including for messages, for the accessory device, even when the accessory device has not properly registered for the respective service.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of the embodiments is considered in conjunction with the following drawings.

Figure 1:
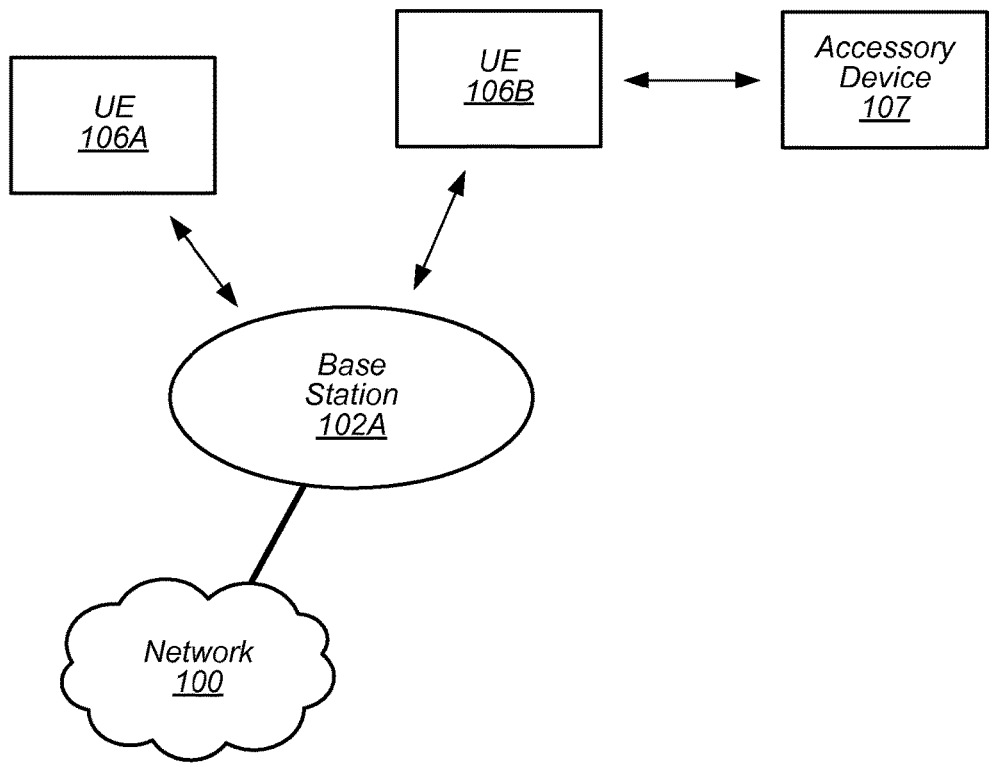
FIG. 1 illustrates an exemplary wireless communication system.

While the features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

The term "configured to" is used herein to connote structure by indicating that the units/circuits/components include structure (e.g., circuitry) that performs the task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke interpretation under 35 U.S.C. §112(f) for that unit/circuit/component.

DETAILED DESCRIPTION

Incorporation by Reference

U.S. patent application Ser. No. 14/475,060 titled "Proxied Push" filed on Sep. 2, 2014, whose inventors are Daniel B. Pollack and Thirumalai Gockul, is hereby incorporated by reference in its entirety as though fully and completely set forth herein.

Terminology

The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), laptops, wearable devices (e.g. smart watch, smart glasses), PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Base Station—The term "Base Station" (also called "eNB") has the full breadth of its ordinary meaning, and at least includes a wireless communication station installed at a fixed location and used to communicate as part of a wireless telephone system or radio system.

Processing Element—refers to various elements or combinations of elements that are capable of performing a function in a device, such as a user equipment, an accessory device, or a cellular network device. Processing elements may include, for example: processors and associated memory, portions or circuits of individual processor cores, entire processor cores, processor arrays, circuits such as an ASIC (Application Specific Integrated Circuit), programmable hardware elements such as a field programmable gate array (FPGA), as well any of various combinations of the above.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

FIG. 1—Wireless Communication System

FIG. 1 illustrates an example of a wireless communication system. It is noted that FIG. 1 represents one possibility among many, and that features of the present disclosure may be implemented in any of various systems, as desired.

As shown, the exemplary wireless communication system includes a base station 102A, which communicates over a transmission medium with one or more wireless devices 106A, 106B, etc. Wireless devices may be user devices, which may be referred to herein as "user equipment" (UE) or UE devices.

The base station 102 may be a base transceiver station (BTS) or cell site, and may include hardware that enables wireless communication with the UE devices 106A and 106B. The base station 102 may also be equipped to communicate with a network 100 (e.g., a core network of a cellular service provider, a telecommunication network such as a public switched telephone network (PSTN), and/or the Internet, among various possibilities). Thus, the base station 102 may facilitate communication between the UE devices 106 and/or between the UE devices 106 and the network 100. In other implementations, base station 102 can be configured to provide communications over one or more other wireless technologies, such as an access point supporting one or more WLAN protocols, such as 802.11 a, b, g, n, ac, ad, and/or ax, or LTE in an unlicensed band (LAA).

The communication area (or coverage area) of the base station 102 may be referred to as a "cell." The base station 102 and the UEs 106 may be configured to communicate over the transmission medium using any of various radio access technologies (RATs) or wireless communication technologies, such as GSM, UMTS (WCDMA, TDS-CDMA), LTE, LTE-Advanced (LTE-A), HSPA, 3GPP2 CDMA2000 (e.g., 1×RTT, 1×EV-DO, HRPD, eHRPD), Wi-Fi, WiMAX etc.

Base station 102 and other similar base stations (not shown) operating according to one or more cellular communication technologies may thus be provided as a network of cells, which may provide continuous or nearly continuous overlapping service to UE devices 106A-N and similar devices over a wide geographic area via one or more cellular communication technologies.

Note that at least in some instances a UE device 106 may be capable of communicating using any of a plurality of wireless communication technologies. For example, a UE device 106 might be configured to communicate using one or more of GSM, UMTS, CDMA2000, WiMAX, LTE, LTE-A, WLAN, Bluetooth, one or more global navigational satellite systems (GNSS, e.g., GPS or GLONASS), one and/or more mobile television broadcasting standards (e.g., ATSC-M/H), etc. Other combinations of wireless communication technologies (including more than two wireless communication technologies) are also possible. Likewise, in some instances a UE device 106 may be configured to communicate using only a single wireless communication technology.

The UE 106 may be configured to communicate with another device, which may be referred to as an accessory device 107. The accessory device 107 may be any of various types of devices that has limited communications abilities. Thus the accessory device 107 may in some instances utilize the UE 106B as a proxy for communication purposes with the base station 102A and hence to the network 100. The limitation on communication abilities of the accessory device 107 can be permanent, e.g., due to limitations on the radio access technologies (RATs) supported, or temporary, e.g., dues to conditions such as power limitations, inability to access a network, or poor reception.

Figure 2:
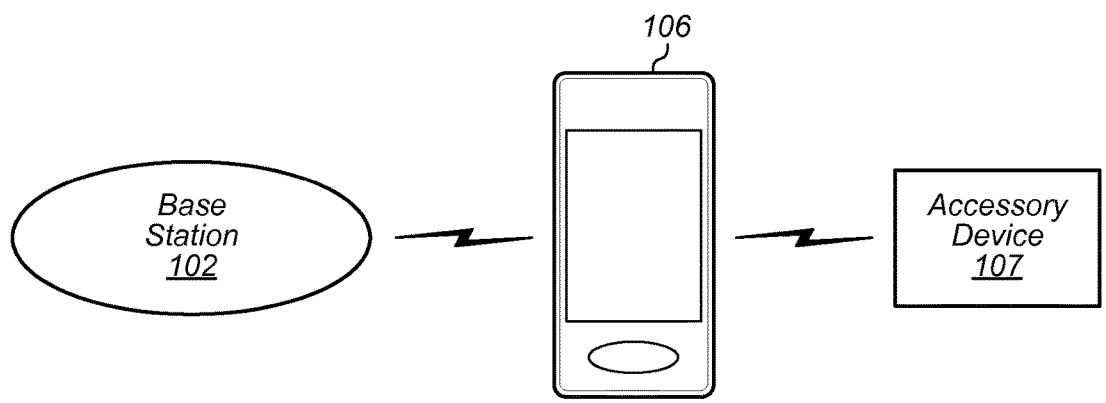
FIG. 2 illustrates an example wireless device such as UE acting as a message proxy for an unregistered device.

FIG. 2 illustrates an example UE device 106 (e.g., one of the devices 106A through 106N) in communication with base station 102. The UE device 106 may have cellular and/or WLAN communication capability, and as described above, may be a device such as a mobile phone, a hand-held device, a media player, a computer, a laptop or a tablet, or virtually any type of wireless device. As shown, the UE 106 may also be in communication with accessory device 107.

The UE device 106 may include a processing element, such as a processor that is configured to execute program instructions stored in memory. The UE device 106 may perform any of the method embodiments described herein by executing such stored instructions. Alternatively, or in addition, the processing element in the UE device 106 may include a programmable hardware element such as an FPGA (field-programmable gate array), or other circuitry, such as an ASIC, that is configured to perform any of the method embodiments described herein, or any portion of any of the method embodiments described herein.

The UE device 106 may include one or more antennas for communicating using one or more wireless communication protocols or technologies. In some embodiments, the UE device 106 might be configured to communicate using a single shared radio. The shared radio may couple to a single antenna, or may couple to multiple antennas (e.g., for MIMO) for performing wireless communications. Alternatively, the UE device 106 may include two or more radios. For example, the UE device 106 might include a shared radio for communicating using either of LTE or 1×RTT (or LTE or GSM), and separate radios for communicating using each of Wi-Fi and Bluetooth. Other configurations are also possible.

The accessory device 107 may be any of various types of devices that has limited communication capabilities. For example, the accessory device 107 may have short range wireless communication capabilities such as Bluetooth and/or NFC, and/or medium range wireless communication capabilities, such as Wi-Fi. In some embodiments, the accessory device 107 may have Wi-Fi communication capabilities that are limited such that it can communicate through Wi-Fi with the UE 106 when the UE 106 is in close proximity to the accessory device 107, such as peer-to-peer networking.

In some embodiments, the accessory device 107 is a smart watch or other type of wearable device. As another example, the accessory device 107 may be a tablet device, such as an iPad, with Wi-Fi capabilities (and possibly no cellular communication capabilities) which is not currently near a Wi-Fi hotspot and hence is not currently able to communicate over Wi-Fi with the Internet. Thus, the term "accessory device" refers to any of various types of devices that in some instances have limited or reduced communication capabilities and hence may opportunistically utilize the UE 106 as a proxy for communication purposes for one or more applications and/or RATs. Then the UE 106 is used by the accessory device 107 as a proxy, and the UE 106 may be referred to as a companion device to the accessory device 107.

Figure 3:
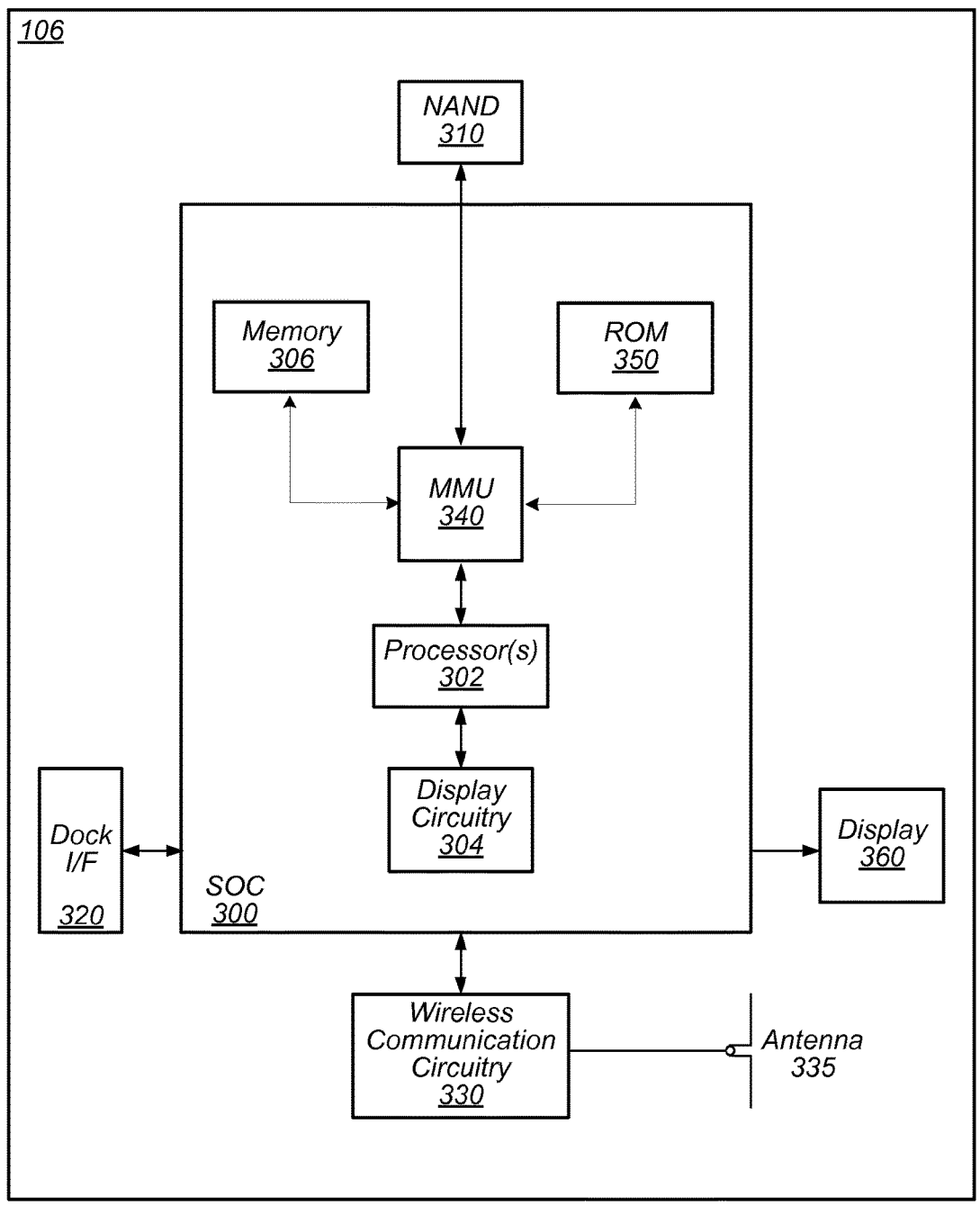
FIG. 3 illustrates a block diagram for one possible implementation of a representative User Equipment (UE)

FIG. 3—Example Block Diagram of a UE

FIG. 3 illustrates one possible block diagram of a UE 106. As shown, the UE 106 may include a system on chip (SOC) 300, which may include portions for various purposes. For example, as shown, the SOC 300 may include a processing element, such as processor(s) 302 which may execute program instructions for the UE 106, and display circuitry 304 which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310). The MMU 340 may be configured to perform memory protection and page table translation or set up. In some embodiments, the MMU 340 may be included as a portion of the processor(s) 302.

The UE 106 may also include other circuits or devices, such as the display circuitry 304, radio 330, connector I/F 320, and/or display 360.

In the embodiment shown, ROM 350 may include a bootloader, which may be executed by the processor(s) 302 during boot up or initialization. As also shown, the SOC 300 may be coupled to various other circuits of the UE 106. For example, the UE 106 may include various types of memory (e.g., including Flash 310), a connector interface 320 (e.g., for coupling to a computer system), the display 360, and wireless communication circuitry (e.g., for communication using LTE, CDMA2000, Bluetooth, Wi-Fi, NFC, GPS, etc.).

The UE device 106 may include at least one antenna, and in some embodiments multiple antennas, for performing wireless communication with base stations and/or other devices. For example, the UE device 106 may use antenna 335 to perform the wireless communication. As noted above, the UE may in some embodiments be configured to communicate wirelessly using a plurality of wireless communication standards.

As described herein, the UE 106 may include a processing element, which may comprise hardware and/or software components for implementing communication proxy methods on behalf of an accessory device according to embodiments of this disclosure. The processing element of the UE device 106 may be processor 302 configured to implement part or all of the methods described herein, e.g., by executing program instructions stored on a memory medium (e.g., a non-transitory computer-readable memory medium). In other embodiments, processing element may be configured as a programmable hardware element, such as an FPGA (Field Programmable Gate Array), or as an ASIC (Application Specific Integrated Circuit).

Figure 4:
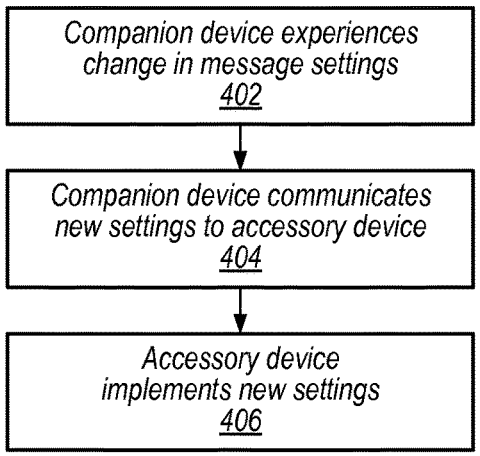
FIG. 4 is a flowchart diagram illustrating an example of synchronization of a state of a message service across multiple devices.

FIG. 4—Synchronizing State of a Message Service Across Multiple Devices

FIG. 4 is a flowchart diagram illustrating an example of synchronization of a state of a message service across multiple devices, e.g., between a companion device and an accessory device. As noted above, in some example embodiments the companion device is UE 106, such as a smart phone, and the accessory device 107 is a wearable device, such as a smart watch.

As shown, at 402 the companion device experiences a change in one or more settings, e.g., relating to an application or service. For example, the user changes the settings on the UE 106 for a communication service, such as a message service. In one specific example, the user may use the settings on their smart phone (e.g., iPhone) to change one or more setting for a messaging service, such as iMessage. In this specific example, the user may enter their phone number and sign in with their Apple ID, and then register for iMessage or otherwise change one or more settings for iMessage.

At 404 the companion device communicates the change in settings (the new settings) to the accessory device. For example, in some embodiments, when the user signs in or signs out of the companion device (UE 106), the companion sends a synchronization message to the accessory device so that the companion device and the accessory device are in sync. Thus, the settings the user entered into the companion device in 402 are propagated to the accessory device in 404.

At 406, the accessory device receives and implements the new or changed setting(s). Thus, in some embodiments, the settings on the companion device define the settings on the accessory device, so that there are no conflicts between the two devices.

In some embodiments, an identifier such as a phone number or other ID (such as an Apple ID) of the UE 106 is associated with a similar (or the same) identifier on the accessory device, so that the accessory device can be another endpoint available to the account associated with the UE 106.

In some embodiments, the companion device maintains an alias for the accessory device, where the alias enables the accessory device to communicate with a network, such as a Wi-Fi or cellular network. If the alias of the accessory device changes (or other settings change), either on the companion device or on the accessory device, the companion device and/or the accessory device communicate those changes to each other.

The accessory device may have a limited (or no) user interface, such that it would be difficult for the user to enter settings of the accessory device using a user interface of the accessory device. Thus the user interface of the companion device may be used to enter/modify settings of the accessory device.

Figure 5:
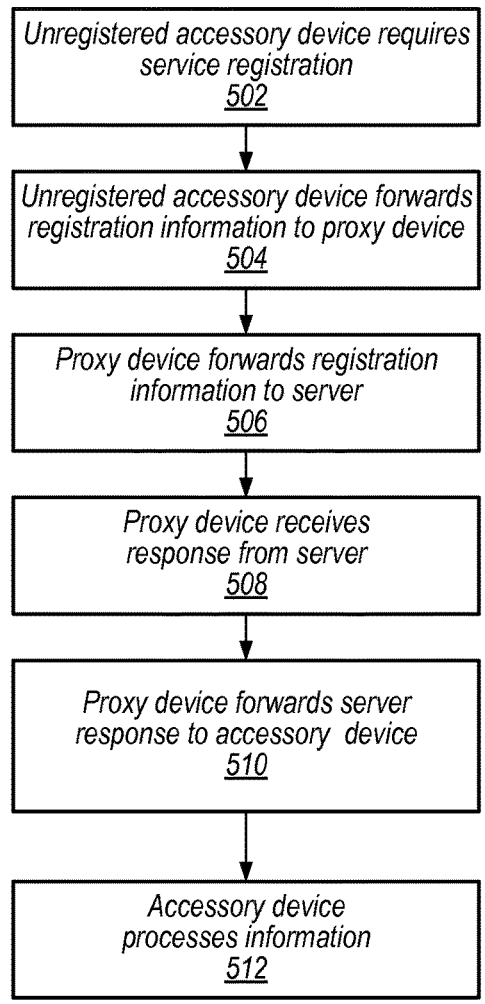
FIG. 5 is a flowchart diagram illustrating an example of service registration through a proxy.

FIG. 5—Service Registration Through Proxy

FIG. 5 is a flowchart diagram illustrating an example of service registration through a proxy. Here the service may be any of various types of communication services that require that a device registers with a server prior to sending or receiving messages. For example, in some embodiments the accessory device is registering with a message service (text messaging and/or IMS messaging), such as iMessage, or a touch-based message service such as "Digital Touch" from Apple.

As shown, at 502 the unregistered accessory device desires service registration. For example, the user may desire to register the accessory device 107, e.g., a wearable device such as smart watch, to enable the accessory device to communicate over a network. The accessory device may be unable to communicate with the Internet on its own, necessitating the use of a companion device for this purpose.

At 504 the unregistered accessory device forwards registration information to the companion device, which is now acting as a proxy for the accessory device (and hence may be referred to as a proxy device). The information may be conveyed between the accessory device and the companion device over a wireless connection, such as a Bluetooth, NFC, or peer-to-peer Wi-Fi connection.

At 506 the proxy device (the companion device (e.g., UE 106) acting as a proxy) forwards the registration information of the unregistered accessory device to a registration server. Initially, this information may comprise a registration request for the accessory service. In response, the registration server may operate to register the accessory device, so that now the accessory device is registered for communication. For example, as noted above, the accessory device may be registering with a message service, and the server may be a message server, such as an iMessage registration server.

At 508 the proxy device receives the response from the registration server, and at 510 the proxy device forwards the server response to the accessory device, which is now registered. At 512 the accessory device receives and processes the response from the registration server.

Thus, in registering an accessory device for a service, the device may make a request to a registration server. The server may in response provide credentials back to the accessory device to enable the accessory device to send and receive messages on the service. In situations where the accessory device cannot currently communicate over the Internet on its own, registration information (such as requests) from the accessory device are routed through a companion device, such as UE 106. Thus here the companion device acts as a proxy for the accessory device for the purpose of service registration. The companion device receives the response from the registration server and forwards those responses to the accessory device. Here it is noted that the Internet connection of the companion device is leveraged, not the companion's credentials. In some embodiments, upon being registered the accessory device may communicate on its own with the network (e.g., the Internet), without using the companion device as a proxy. In situations where the registered accessory device is experiencing temporary communication issues, the registered accessory device may use the companion device as a proxy for communications as described herein.

Figure 6:
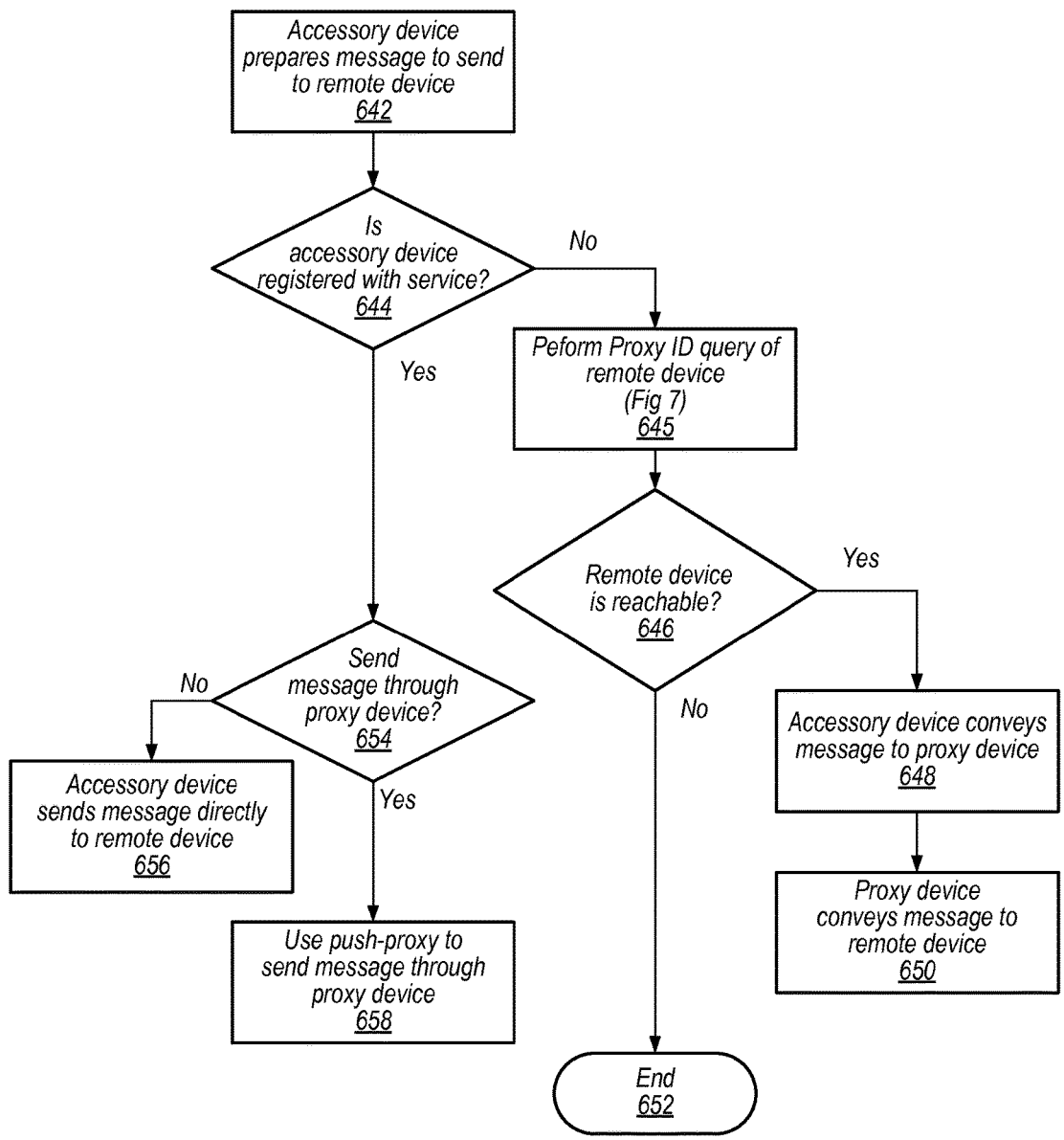
FIG. 6 is a flowchart diagram illustrating an example of proxying an outgoing message from an unregistered accessory device.

FIG. 6—Proxying an Outgoing Message from the Unregistered Accessory Device

FIG. 6 is a flowchart diagram illustrating an example of proxying an outgoing message from an unregistered accessory device. The method described in FIG. 6 presumes that the accessory device has not registered with a messaging server as described above in FIG. 5. Since the accessory device has not registered with the messaging server, the accessory device is unable to send or receive messages by itself. Hence, in this situation the accessory device may use the companion device as a proxy for sending outgoing communications.

As shown at 642 the accessory device prepares a message to send to a remote device. This message may be automatically generated by the accessory device, or may be generated in response to user input creating a message. For example, the user may create on a wearable device a touch-based message, such as using Apple Digital Touch, that the user desires to send to another device (e.g., to communicate with another person). Alternatively, the user may create a text message or IMS message on the wearable device that the user desires to send to a remote device. In embodiments involving other applications, other communications can be prepared, such as images, audio, video, text, or other such data.

At 644 the accessory device determines whether it has previously registered with the message service, e.g., as described in FIG. 5. If the accessory device has previously registered with the message service, then the accessory device may have the choice to send the message directly to the remote device over the Internet (656) (or other available communication pathway) or to use the companion device as a proxy (658). If the direct communication method is selected in 654, then in 656 the accessory device may choose to send the message directly to the remote device over the Internet. If the registered accessory device chooses to use the companion device as a proxy, then in 658 a "push-proxy" method may be used to send the message through the proxy device. This "push-proxy" method is described in U.S. patent application Ser. No. 14/475,060 titled "Proxied Push" filed on Sep. 2, 2014, which was incorporated by reference above.

If the accessory device is unregistered as determined in 644, then in 645 the accessory device may desire to retrieve registration information of the remote device in order to determine whether the remote device is reachable. To obtain the desired information the accessory device may perform a proxy ID query. Step 645 is described in greater detail with respect to FIG. 7 below.

At 646, after obtaining registration information as described at step 645 (and described in detail in FIG. 7), the accessory device may process this information to determine whether the remote device is reachable, i.e., whether the remote device is registered for the service and may receive messages.

At 648, if the remote device is reachable as determined in 646, the accessory device may convey the message to the proxy device. Because the accessory device is not registered with the service and may not directly communicate the message with the server over the Internet, it may use the proxy device to send the message.

At 650, after receiving the message conveyed by the accessory device at 648, the proxy device may convey the message to the remote device. For example, the proxy device may communicate the message to the messaging server, which may then send the message to the remote device.

If the remote device is not reachable as determined at 646, then as shown at 652 the accessory device may not attempt to send the message.

Figure 7:
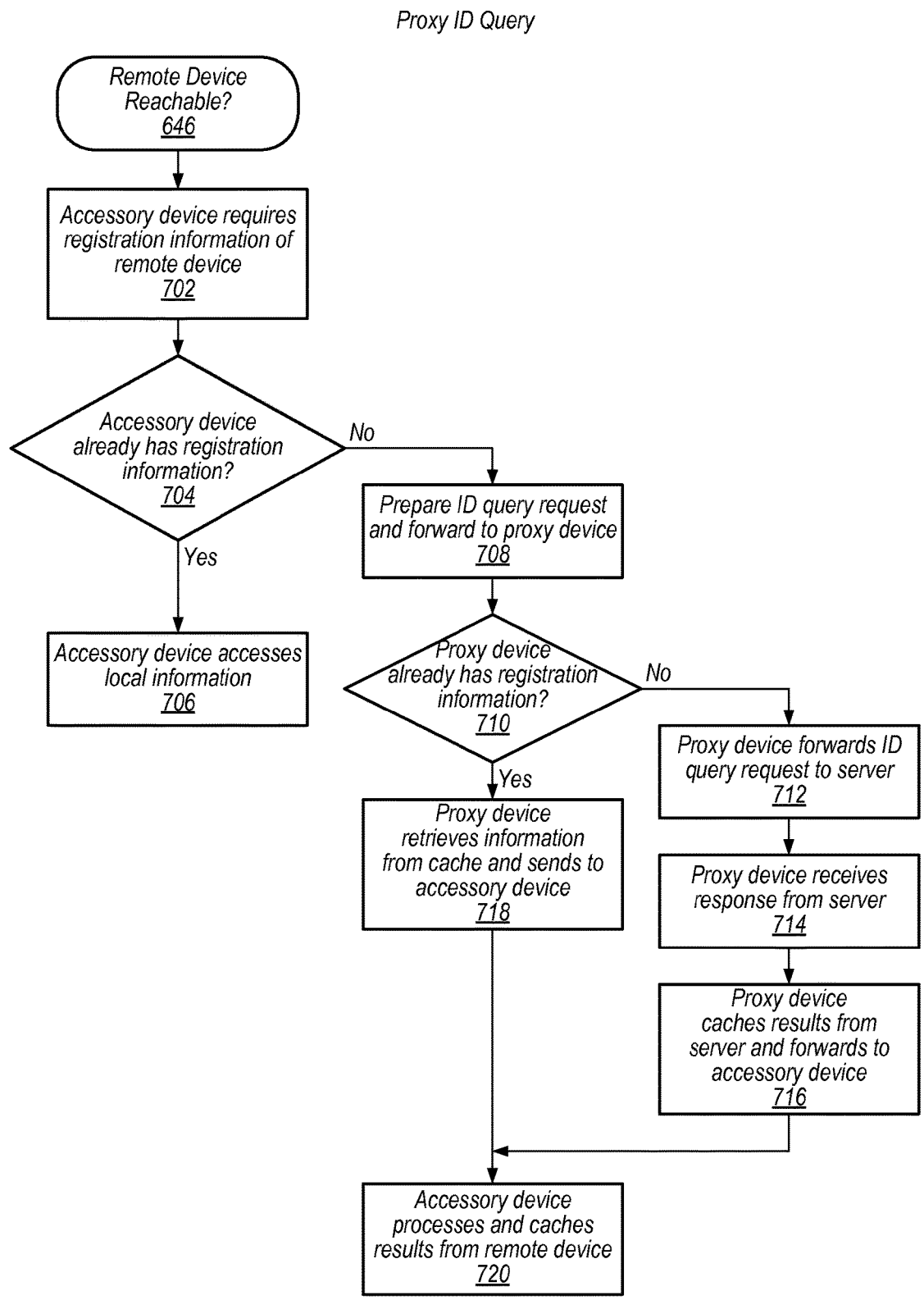
FIG. 7 is a flowchart diagram illustrating an example method for determining if a remote device is reachable.

FIG. 7—Proxy ID Query

FIG. 7 is a flowchart diagram illustrating an example method for performing an ID query, e.g., to determine whether a remote device is registered for a service and reachable. For example, the accessory device, which in this case is not registered for a service (and hence may be referred to as the unregistered device), may operate in conjunction with the companion device, which acts as a proxy (and hence may be referred to as the proxy device) in order to perform the ID query and to obtain registration information for a remote device.

At 702, the unregistered accessory device may require the registration status of the remote device. For example, the user of the accessory device may attempt to communicate a message intended for the remote device through a service that requires prior registration of recipient devices. To send the message, the accessory device may first require information to determine whether the remote device is registered with the service and therefore able to receive the message.

At 704, the accessory device may check an internal cache to determine whether it already contains information concerning the registration status of the remote device. For example, it may be possible that the registration information was previously conveyed to the accessory device in an earlier query and stored in the internal cache of the accessory device. This facilitates subsequent communications to the same remote device, as accessing local data is typically faster than performing a proxy ID query.

At 706, if the accessory device already contains the required information concerning the registration status of the remote device as determined in 704, the accessory device may access its local storage to retrieve the information. In this case, there is no need to perform a proxy ID query, as the accessory device is able to use data stored in its internal cache to determine the status or reachability of the remote device.

At 708, if the accessory device does not have the registration information as determined in 704, it may prepare an ID query request. For example, the accessory device may not locate the desired information in its internal cache, e.g., experience a cache miss. The information may have expired after a period of time after which it may have been considered obsolete, or is otherwise absent from the cache. Because the accessory device is not registered with the service, it may be unable to perform a direct ID query, i.e., it may be unable communicate to the service through the Internet to look up the status of the remote device. Therefore, the accessory device may then forward the prepared ID query request to the proxy device.

At 710, after receiving the ID query sent by the accessory device in 706, the proxy device may check an internal cache to determine whether it already contains the desired information locally. For example, the proxy device may have cached the results of prior ID queries to facilitate subsequent communications with remote devices with which it has recently communicated. If the proxy device locates the desired registration information of the remote device in the cache, it may be unnecessary to perform the ID query request.

If the proxy device does not locate the registration information of the remote device in local storage (e.g., experiences a cache miss) as determined in 710, then operation proceeds to 712. In this case, at 712 the proxy device may forward the ID query to a server to obtain the desired information. The server may then operate to retrieve registration information associated with the remote device and communicate this information to the proxy device.

At 714, the proxy device may receive a response from the server to the ID query request sent in 712.

At 716, the proxy device may then store the information contained in the response in its internal cache and forward the information to the accessory device. Operation then proceeds to 720.

If the proxy device already contains the registration information in its internal cache as determined in 710, then at 718 the proxy device may retrieve the information by directly accessing its cache and forward the information to the accessory device. For example, as described above the desired information may have been conveyed to the proxy device in an earlier query and stored in the internal cache of the proxy device in order to facilitate subsequent communications to the remote device. In this case, there is no need to forward the ID query request to the server as described in 712-716, as the proxy device may locally access the desired information and communicate it the accessory device. Operation then proceeds to 720.

In 720, the accessory device receives the registration information of the remote device as communicated by the proxy device in either 716 or 718. The accessory device may cache the information to facilitate subsequent communications with the remote device. The accessory device may proceed to process the received information to determine the registration status or reachability of the remote device.

Figure 8:
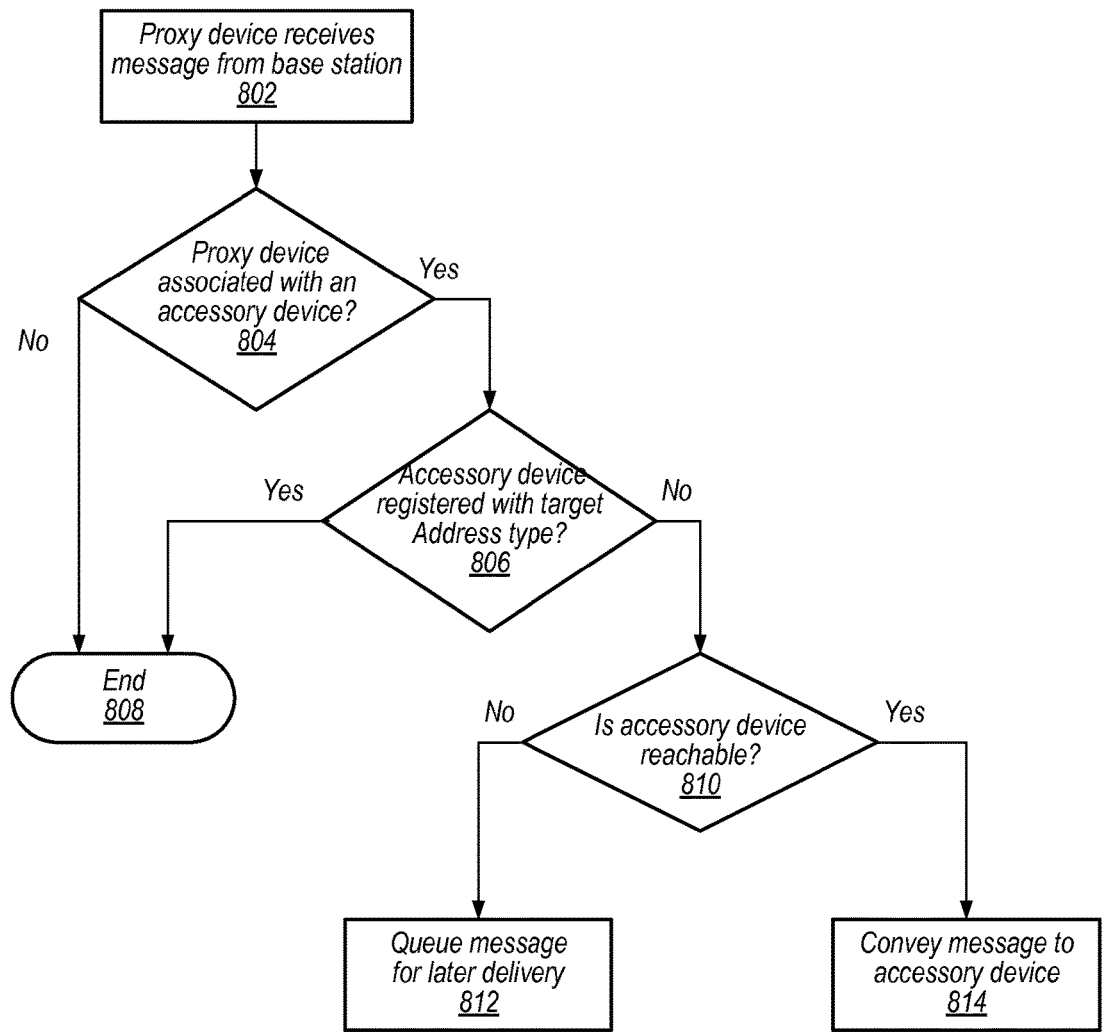
FIG. 8 is a flowchart diagram illustrating an example of proxying an incoming message to an unregistered accessory device.

FIG. 8—Proxying an Incoming Message to the Accessory Device

FIG. 8 is a flowchart diagram illustrating an example method by which the companion device may convey an incoming message to the accessory device. In this case the accessory device may or may not be registered with the service while the companion device is registered with the service.

As shown at 802, the companion device may receive an incoming message from the network. For example, a remote device may have generated and sent a text message, Digital Touch message, or IMS message targeting (addressed to) the account associated with the proxy device.

After receiving a message as in 802, at 804 the companion device may determine whether it is associated with (or paired with) an accessory device. For example, if the companion device has been paired with an accessory device, it may have stored internal information indicating this relationship. Here the term "paired" refers to a stored association between a companion device and an accessory device, such that the companion device may share settings and/or act as a communication proxy for the accessory device.

If the companion device determines in 804 that there is no associated accessory device, i.e., finds no indication of an associated accessory device, then the process may terminate at 808.

If the companion device is associated with (or paired with) an accessory device as determined at 804, then operation proceeds to 806. In this case, the companion device may have accessed local storage to obtain information indicating the existence of an associated (or paired) accessory device.

At 806 the companion device may then determine whether the accessory device is registered with the service to receive messages at the address targeted by the message received at 802. It is possible that the accessory device had earlier registered with the service, in which case the companion device may have received information regarding this registration and saved it to local storage. The companion device may retrieve this information to determine the address or addresses at which the associated accessory device is reachable and whether the accessory device is reachable at the address targeted by the message.

If the accessory device is registered with the service to receive messages at the targeted address as determined in 806, then the accessory device may be able to receive communications, e.g., the message, directly from the service. Thus, to avoid sending duplicate messages to the accessory device, the companion device may not convey the message to the accessory device. Thus in this case operation terminates at 808.

If the accessory device is not registered to receive messages directly from the service as determined at 806, the companion device may determine whether it is able to convey the message to the accessory device. Here, the companion device may check internal data regarding its relationship with the accessory device to determine whether the accessory device is reachable, e.g., is sufficiently proximate to the companion device for wireless communication.

If the accessory device is reachable by the companion device as determined at 810, at 814 the companion device may convey the message to the accessory device. Here, because the accessory device is not registered with the server to receive the message, the companion device serves as a proxy to relay the message to the accessory device. In this way both devices may receive the message in a relatively short timeframe.

If the accessory device is not reachable by the companion device as determined at 810, the companion device may then queue the message at 812. Thus, the companion device may not attempt to convey the message to the accessory device presently, but store it internally for later delivery. If the companion device determines at a later time that the accessory device is reachable, for example, because the two devices come into sufficiently close proximity, then the companion device may choose to convey the message from the queue to the accessory device at this time.

In some embodiments, the companion device may determine if the message is of a type acceptable by or compatible with the accessory device, e.g., capable of being received or displayed by the accessory device. For example, where the accessory device is a smart watch, the smart watch may not be capable of displaying certain types of documents, such as PDFs, maps, etc. In this case, the companion device may not perform one or more of steps 804-810, and may not convey the incompatible message to the accessory device.

Also, in some embodiments the companion device (proxy device) presents the received message on its display when received at 802. However, certain types of messages, such as Digital Touch messages, may be incompatible with the companion device, and hence not displayed on the companion device (e.g., the smart phone) but is conveyed to and presented on the accessory device, e.g., the smart watch.

Embodiments of the present disclosure may be realized in any of various forms. For example some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE 106) may be configured to include a processor (or a set of processors) and a memory medium, where the memory medium stores program instructions, where the processor is configured to read and execute the program instructions from the memory medium, where the program instructions are executable to implement a method, e.g., any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A user equipment device (UE), comprising:
at least one antenna for performing wireless communication;
at least one radio communicatively coupled to the at least one antenna, wherein the at least one radio is configured to perform communication using at least one radio access technology (RAT);
at least one processing element communicatively coupled to the at least one radio, wherein the at least one processing element and the at least one radio are configured to perform wireless communications using the at least one antenna;
wherein the UE is configured to:
receive a message from a base station in a wireless manner, wherein the message is intended for the UE;
determine if the UE is paired with an accessory device and is capable of wireless communication with the accessory device;
determine if the accessory device is registered to receive the message; and
provide the message to the accessory device in a wireless manner at least in part in response to the UE determining that the UE is paired with the accessory device, is capable of wireless communication with the accessory device, and that the accessory device is not registered to receive the message.

2. The UE of claim 1,
wherein the UE is configured to not provide the message to the accessory device if either the UE is not paired with the accessory device or the UE is not capable of wireless communication with the accessory device.

3. The UE of claim 1,
wherein the UE is configured to determine if the accessory device is registered with a service to receive messages at an address targeted by the received message; and
wherein the UE is configured to provide the message to the accessory device in response to the UE determining that the UE is paired with the accessory device and is in wireless communication with the accessory device and that the accessory device is not registered with a service to receive messages at an address targeted by the received message.

4. The UE of claim 1,
wherein, in determining if the UE is paired with an accessory device, the UE is configured to determine if the UE maintains a stored association between the UE and the accessory device.

5. The UE of claim 1,
wherein the UE is further configured to:
receive one or more changes to message settings; and
communicate the one or more changes to message settings to the accessory device.

6. The UE of claim 1,
wherein the UE is a smart phone; and
wherein the accessory device is a smart watch in wireless communication with the smart phone.

7. The UE of claim 1,
wherein in determining if the accessory device is not registered to receive the message, the UE is configured to determine if the accessory device is registered with a service to receive messages at an address targeted by the received message.

8. An apparatus for inclusion in a user equipment (UE), comprising:
a processing element, wherein the processing element is configured to:
receive a message from a base station in a wireless manner, wherein the message is addressed to a user account;
determine whether the UE is paired with an accessory device and whether the accessory device is registered for messaging services; and
initiate transmission of the message to the accessory device in a wireless manner at least in part in response to determining that the UE is paired with the accessory device and that the accessory device is not registered for messaging services.

9. The apparatus of claim 8,
wherein the UE is configured to not provide the message to the accessory device if either the UE is not paired with the accessory device or the accessory device is registered for messaging services.

10. The apparatus of claim 8,
wherein the processing element is configured to determine if the accessory device is within an effective communication range of the UE; and
wherein the UE does not provide the message to the accessory device if the accessory device is not within an effective communication range of the UE.

11. The apparatus of claim 8,
wherein the processing element is configured to determine if the accessory device is reachable by the UE;
wherein the UE does not provide the message to the accessory device if the accessory device is not reachable by the UE.

12. The apparatus of claim 8,
wherein in determining if the accessory device is not registered for messaging services, the processing element is configured to determine if the accessory device is registered with a service to receive messages at an address targeted by the received message.

13. The apparatus of claim 8,
wherein the UE is further configured to:
receive one or more changes to message settings; and
communicate the one or more changes to message settings to the accessory device.

14. The apparatus of claim 8,
wherein the apparatus is targeted for inclusion in a smart phone; and
wherein the accessory device is a smart watch in wireless communication with the smart phone.

15. A user equipment device (UE), comprising:
at least one antenna for performing wireless communication;
at least one radio coupled to the at least one antenna, wherein the at least one radio is configured to perform communication using at least one radio access technology (RAT);
at least one processing element coupled to the at least one radio, wherein the at least one processing element and the at least one radio are configured to perform wireless communications using the at least one antenna;
wherein the UE is configured to:
receive a message from an accessory device in a wireless manner, wherein the message is intended for a remote device;

determine if the accessory device is registered with a message service;

transmit the message to the remote device in response to determining that the accessory device is not registered with the message service.

16. The UE of claim 15, wherein the UE is further configured to determine if the remote device is reachable;

wherein the UE is configured to transmit the message to the remote device in response to determining that the accessory device is not registered with a message service and that the remote device is reachable.

17. The UE of claim 15, wherein the UE is configured to:
receive an identification query request from the accessory device regarding a registration status of the remote device;
determine if the UE already has registration information of the remote device; and
provide the identification query request to an identification server in response to determining that the UE does not already have the registration information of the remote device.

18. The UE of claim 15, wherein the UE is configured to not transmit the message to the remote device in response to determining that the accessory device is registered with the message service.

19. The UE of claim 15, wherein the UE is configured to:
receive a second message from a base station in a wireless manner, wherein the second message is intended for the UE;
determine if the UE is paired with the accessory device and is capable of wireless communication with the accessory device; and
provide the second message to the accessory device in a wireless manner at least in part in response to the UE determining that the UE is paired with the accessory device and is capable of wireless communication with the accessory device.

20. The UE of claim 15, wherein the UE is a smart phone; and
wherein the accessory device is a smart watch in wireless communication with the smart phone.

* * * * *